United States Patent [19]
Nelson

[11] Patent Number: 5,610,337
[45] Date of Patent: Mar. 11, 1997

[54] METHOD OF MEASURING THE AMPLITUDE AND FREQUENCY OF AN ACCELERATION

[75] Inventor: William E. Nelson, Dallas, Tex.

[73] Assignee: Texas Instruments Incorporated, Dallas, Tex.

[21] Appl. No.: 401,668

[22] Filed: Mar. 9, 1995

Related U.S. Application Data

[63] Continuation of Ser. No. 142,548, Oct. 22, 1993, abandoned, which is a continuation of Ser. No. 883,616, Apr. 30, 1992, abandoned.

[51] Int. Cl.$^6$ .................................................. G01D 21/00
[52] U.S. Cl. .................... 73/651; 73/661; 73/514.29; 200/61.46; 200/61.49; 200/61.51; 340/669
[58] Field of Search ........................... 73/517 R, 517 A, 73/651, 661, 514.29, 514.02; 340/669; 200/61.45 R, 61.46, 61.48, 61.49, 61.51; 377/23; 307/121, 117

[56] References Cited

U.S. PATENT DOCUMENTS

| | | | |
|---|---|---|---|
| 3,727,209 | 4/1973 | White et al. | 73/517 R |
| 4,196,429 | 4/1980 | Davis | 340/669 |
| 4,543,457 | 9/1985 | Petersen et al. | 200/61.45 R |
| 4,736,629 | 4/1988 | Cole | 73/517 R |
| 4,855,544 | 8/1989 | Glenn | 200/61.48 |
| 4,891,984 | 1/1990 | Fujii et al. | 73/517 R |
| 4,955,233 | 9/1990 | Hanson | 73/517 R |
| 5,001,933 | 3/1991 | Brand | 73/651 |
| 5,009,106 | 4/1991 | Kubler et al. | 73/651 |
| 5,353,641 | 10/1994 | Tang | 73/517 R |

FOREIGN PATENT DOCUMENTS

| | | | |
|---|---|---|---|
| 480274 | 4/1992 | European Pat. Off. | 73/517 R |
| 59009 | 3/1989 | Japan | 73/651 |

OTHER PUBLICATIONS

Genberg, et al., "Acceleration Sensors for Solid State Electronic Safety and Arming Devices," *International J. for Hybrid Microelectronics*, vol. 12, No. 3, Sep. 1989, pp. 126–138.

Frobenius, et al, "Microminiature Ganged Threshold Accelerometers Compatible with Integrated Cricuit Technology", IEEE Transactions on Electron Devices, vol. ED–19, No. 1, Jan., 1972.

Newell, "Miniaturization of Tuning Forks", *Science*, vol. 161, Sep. 27, 1968.

Gold, et al, "Micro–sensor Rides on IC", *Electronic Enginering Times*, Aug. 12, 1991, Issue 654.

Chen, et al, "Integrated Silicon Microbeam PI–FET Accelerometer", IEEE Transactions on Electron Devices, vol. ED–29, No. 1, Jan., 1982.

"Micromechanical Accelerometer Integrated with MOS Detection Circuitry", Petersen, et al, IEEE Transactions on Electron Devices, vol. ED–29, No. 1, Jan., 1982.

Roylance, et al, "A Batch–Fabricated Silicon Accelerometer", IEEE Transactions on Electron Devices, vol. ED–26, No. 12, Dec., 1979.

*Primary Examiner*—Hezron E. Williams
*Assistant Examiner*—Nashmiya Ashraf
*Attorney, Agent, or Firm*—Charles A. Brill; James C. Kesterson; Richard L. Donaldson

[57] ABSTRACT

A digital accelerometer manufactured from arrays $11a$–$11e$ of micro-mechanical sensing elements 12. The sensing elements 12 of different arrays $11a$–$11e$ are designed for detecting acceleration in a particular rotational or translational direction, such that their response to acceleration in other directions is minimized. Further, the sensing elements 12 have size and proof mass parameters that may be adjusted to vary their frequency response and sensitivity to amplitude of acceleration. Arrays $11a$–$11e$ of sensing elements 12 provide detection of a range of frequency levels and amplitudes at each frequency. At an appropriate frequency and amplitude of an applied acceleration, a sensing element 12 moves to contact an electrode 126, producing an electrical signal, which may be stored as a data bit. The sensing elements, when used in combination with memory 15 and processing devices 16, results in an intelligent accelerometer whose fabrication techniques are compatible with those used for the digital processing devices.

24 Claims, 8 Drawing Sheets

METHOD OF MEASURING THE AMPLITUDE AND FREQUENCY OF AN ACCELERATION

This application is a Continuation of application Ser. No. 08/142,548, filed Oct. 22, 1993, now abandoned which is a Continuation of previously filed application Ser. No. 07/883,616, filed Apr. 30, 1992 now abandoned.

TECHNICAL FIELD OF THE INVENTION

This invention relates to intelligent sensing devices, and more particularly to a digital micro-accelerometer integrated with a microprocessor.

BACKGROUND OF THE INVENTION

A basic principle of a position-sensing accelerometer is that acceleration to which it is subjected forces an attached mass to move in the direction of its sensitive axis. The mass is attached to a spring or similar element that counteracts the movement of the mass, such that the mass moves until the force from the spring balances the force that the mass experiences due to the acceleration. Measurement of the mass's movement in relation to the body of the transducer permits the acceleration itself to be calculated. Other accelerometers are strain-measuring, and have piezo-electric or piezo-resistive material that senses the stress induced by an inertial mass or the strain induced by a spring supporting the mass.

Applications for accelerometers include antilock braking systems, ride suspension systems, in-flight aircraft monitoring, all of which call for small, inexpensive, and reliable devices. For real-time monitoring, in-line digital processing devices control the accelerometer and interpret its output.

Most accelerometers are analog, in the sense that the measurand is an electrical current that varies with the frequency or amplitude of acceleration. However, some accelerometers are digital, in the sense that the "spring" either makes or breaks an electrical contact in response to acceleration. A series of sensing elements are provided, each having an incrementally higher response threshold and each making an electrical contact when its threshold is reached. A digital accelerometer of this nature is described in an article entitled "Microminiature Ganged Threshold Accelerometers Compatible with Integrated Circuit Technology", *IEEE Trans. Elec. Devices*, ED-19, No. 1, January 1972.

A limitation of many existing accelerometers is that they are large in size relative to the digital controllers and processors used to interpret the accelerometer's output. Size is an especially important consideration for digital accelerometers, whose resolution depends on how many sensing elements are provided. Also, the processes for making many existing accelerometers are not compatible with those used for digital processor devices, so that hybrid assembly is required to combine them with digital processing circuitry. This makes "intelligent accelerometers" expensive to manufacture.

Attempts to reduce the size of accelerometers have led to the manufacture of micro-accelerometers, which may be manufactured using silicon fabrication techniques. These devices typically have masses and springs sculpted from a piece of silicon that exploit the mechanical, as opposed to the electrical, properties of silicon. One type of micro-accelerometer has tiny cantilever beam structures that extend over an etched-out cavity so that they can bend under the force from acceleration. Others use piston-like structures on flexible hinges.

Existing micro-accelerometers have various limitations. The sensing elements often couple motion in more than one direction, and thus do not permit analysis of direction of acceleration. Also, they do not discriminate among different exciting force frequencies. Further, their electrical contacts are susceptible to "stuck on" conditions.

A need exists for an improved micro-accelerometer that is easily integrated with digital processor circuitry, that provides sophisticated analysis of acceleration forces, and that reduces error conditions.

SUMMARY OF THE INVENTION

One aspect of the invention is a digital accelerometer for detecting translational or rotational acceleration, or both. For a given type and direction of acceleration, an array of sensing elements has rows and columns of micro-mechanical sensing elements, each sensitive to a predetermined frequency and magnitude of acceleration. The sensitivity of each sensing element is a function of its various mass and size parameters. An applied acceleration that is within the sensitivity range of a sensing element causes it to tilt and make an electrical contact. The sensing element thus acts as a switch, causing a signal to be stored in a memory cell. The memory cells can be read by a processor to determine which sensing elements have been tilted, and therefore to determine the frequency and amplitude of acceleration.

A technical advantage of the invention is that different types of sensor arrays are provided, each type for determining translational acceleration in a horizontal or vertical plane or rotational acceleration in a horizontal plane. The sensing elements of each type of array are designed to minimize their sensitivity to acceleration measured by the other arrays. Also, reset means are provided for preventing faults due to stuck contacts.

Each array detects a range of acceleration frequency levels, as well as amplitudes of acceleration at each frequency level. An "intelligent accelerometer", which has sensor arrays in communication with memory and a processor, provides an analysis of complex mechanical patterns, on the basis of both frequency and amplitude data. As an example of the application of such a device, a car containing the accelerometer could be intentionally crashed, and a record made of the full spectrum of the vibrational effects in all directions as the crash evolves in time. That record has distinct characteristics in terms of frequency, amplitude, and time. Using this analysis, an intelligent accelerometer having this stored record could be installed in consumers' cars to improve triggering of restraint systems.

The intelligent accelerometer requires no calibration. Acceleration patterns for a given event can be calculated or obtained experimentally. The fabrication process for the device ensures that all devices are similar, thus an acceleration pattern detected by a test device will be repeated for the same applied acceleration applied to other devices. The digital nature of the accelerometer makes the design immune to the effects of temperature variation, aging, or other forms of calibration drift and offset.

DETAILED DESCRIPTION OF THE INVENTION

Those aspects of the accelerometer involving detection of translational acceleration are described below in connection with FIGS. 1–6. Other versions of the accelerometer, which will detect rotational acceleration, are described in connection with FIGS. 7 and 8. Finally, a full-featured accelerometer, for detecting rotational as well as translational acceleration, is described in connection with FIG. 9.

Figure 1A:
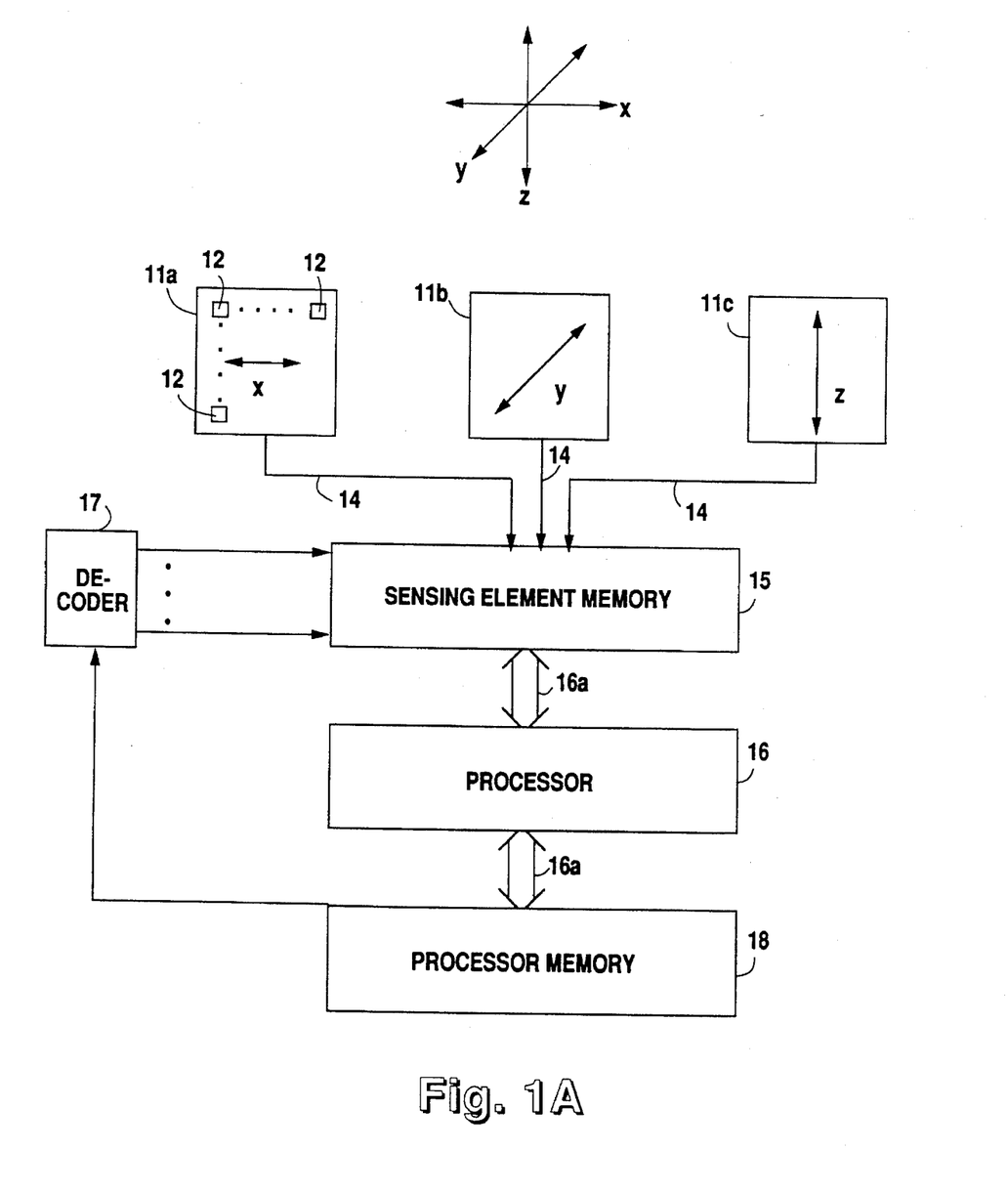
FIG. 1A illustrates an accelerometer device having a number of sensor arrays.

FIG. 1A illustrates an accelerometer device having a sensing element layer, comprised of a number of sensor arrays 11a–11c. Each array 11a–11c detects translational acceleration in a different direction. These directions are indicated as corresponding to the x-y-z axes of a conventional Cartesian coordinate system, where each of three axes are orthogonal to each other.

Thus, accelerometer 10 provides a tri-axial means for measuring acceleration. Data pertaining to each direction may be obtained, and vector analysis used to calculate composite acceleration values. If acceleration in only one direction is desired to be detected, only one of the arrays 11a–11c may be used.

Each of the arrays 11a–11c is comprised of rows and columns of micro-mechanical sensing elements 12. Each array 11a–11c has a type of sensing element 12 that is specifically designed for sensitivity in one of the three translational directions. Furthermore, as will be explained below in detail, within each array 11a–11c, the sensing elements 12 vary in structure, such that each sensing element 12 is resonant at a predetermined frequency and has a threshold sensitivity at a predetermined amplitude of acceleration.

Although the sensing elements 12 of each array 11a–11c are discussed in detail below, in many respects, their structure and fabrication are similar to those used in "deformable mirror devices (DMD's)" for spatial light modulation applications. Such devices are described in U.S. Pat. No. 5,061,049 entitled "Spatial Light Modulator and Method", which is incorporated by reference herein. As indicated below, the accelerometer described herein also shares the same fabrication advantages of SLM's in that the micro-mechanical array fabrication process is compatible with CMOS fabrication for their memory cells.

As will be explained in further detail in connection with FIGS. 2–6, each sensing element 12 generates either an on or an off signal, depending on whether it has been subjected to an acceleration that is at its resonant frequency and is below its threshold of sensitivity to amplitude. More specifically, each sensing element 12 undergoes some sort of movement when subjected to acceleration, and a sufficient extent of movement causes the sensing element 12 to close an electrical contact. This switching action produces an electrical signal, that can be delivered to a memory cell and stored as a data bit. Thus, each sensing element 12 is in communication with at least one memory cell, which stores an on or off state. In FIG. 1A, these memory cells form a sensing element memory 15.

Figure 1B:
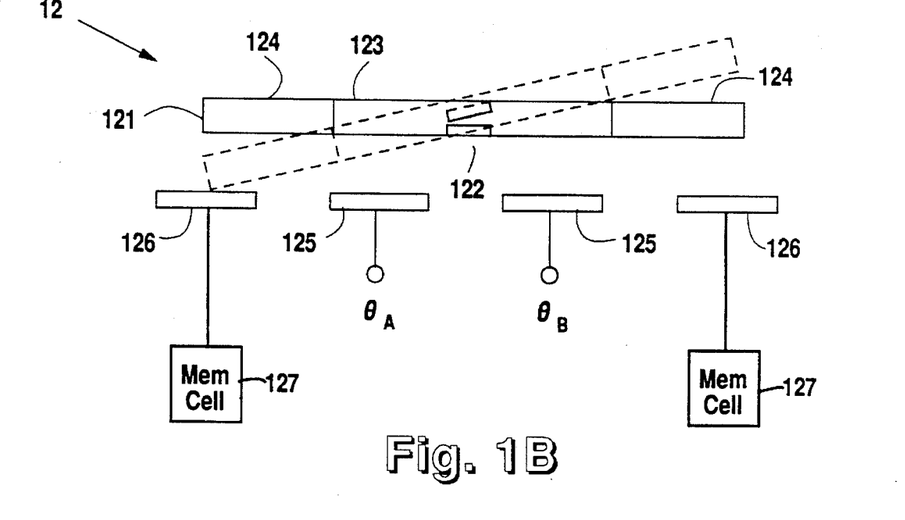
FIG. 1B illustrates a representative sensing element and its contact and reset electrodes.

FIG. 1B illustrates a sensing element 12, which is representative of the various sensing elements to be described in connection with FIGS. 2–8. In general, each sensing element 12 has some sort of tilting beam 121. Each beam 121 has a hinge portion 122, a rigid connecting member 123, and a proof mass 124 at each free end. As discussed below, a sensing element designed for detecting vertical acceleration has only one free end, and thus one tilted position. This is a "bi-state" sensing element in the sense that it has either a tilted or nontilted state. Other sensing elements are designed for detecting translational acceleration in a horizontal plane or rotational acceleration about a horizontal axis. These sensing elements are "tri-state" in the sense that they have two possible tilted positions, as well as a nontilted position.

The sensing element 12 of FIG. 1B has three states, and is shown in its untilted, or neutral, state. The deflected position shown with dotted lines illustrates a second state, i.e., rotated counterclockwise. The third state would be rotated clockwise.

The input/output circuitry of each sensing element 12 is comprised of a reset/test electrode 125 and a contact electrode 126 for each state of the sensing element 12. In operation, a given external mechanical acceleration applied to an array 11 results in a given mechanical response, i.e., a tilt, by each sensing element 12. Each response may or may not result in an electrical response via a contact electrode 126.

It is necessary to store the inputs from each contact electrode 126 for subsequent readout by processor 16. Thus, beam 121 acts as a microswitch to write data to a memory cell 127. If a sensing element 12 has more than one tilted position, such as the two tilted states of FIG. 1B, each sensing element 12 has a memory cell 127 that can store data for each state.

It is also necessary to be able to address each sensing element 12 so that it can be set to a selected state for test purposes. All sensing elements 12 may be simultaneously addressed to the selected test state; random addressing under control of processor 16 is not required. For testing, reset electrodes 125 are used to collectively energize all sensing elements 12 to a given state. In FIG. 1B, the tilted states are controlled for test and reset purposes by phase voltages, $\theta_A$ and $\theta_B$.

A third required function is the ability to implement a reset pulse so that all sensing elements 12 may be reset to a nontilted position. For reset, voltages are too high to be applied directly to beam 121, which is, in effect, a switch in a CMOS circuit. Instead, reset is applied to an isolated part of an air gap via reset electrodes 125. The reset operation is described in U.S. Pat. No. 5,096,279 entitled "Spatial Light Modulator and Method" which is incorporated by reference herein.

Figure 1C:
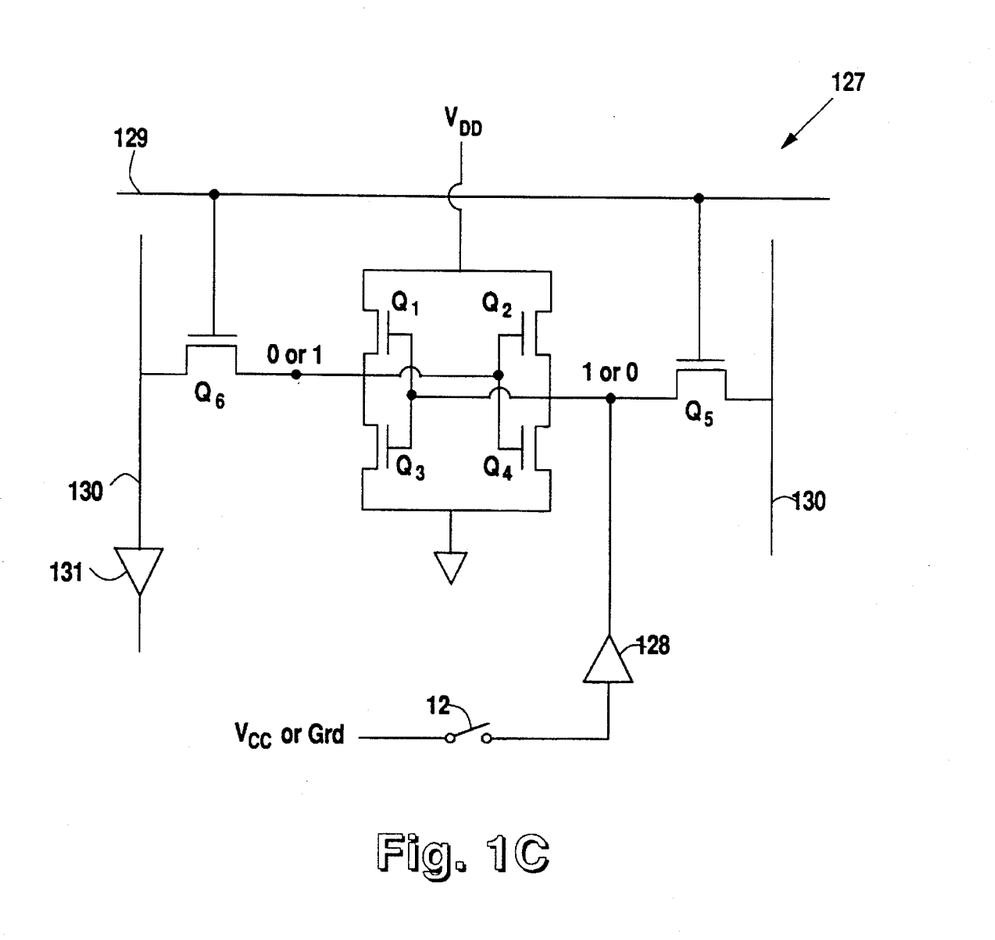
FIG. 1C is a schematic diagram of a memory cell and readout select circuit associated with a sensing element.

FIG. 1C is a schematic diagram of a memory cell 127 for storing and reading out the occurrence or nonoccurrence of a contact by sensing element 12. A memory cell 127 is required for each tilted state of a sensing element 12, because it must be preset to a known state and switched to another state when a contact is made. In the preferred embodiment, SRAM (static random access memory) cells are used because of their nonvolatility.

To assure long-term reliability, each sensing element 12, represented as a switch in FIG. 1C, is protected by buffer 128. This ensures that contact by a sensing element 12 to a contact electrode 126 results in a limited current flow, and minimal potential difference.

Memory cell 127 is a six-transistor SRAM cell, having a cross-coupled inverter, Q1–Q4, and complementary read-write pass gates, Q5 and Q6. Word line 129 selects the cell for test set-up or readout, and bit-lines 130 permit preselecting the state of memory cell 127 and subsequently reading out that state.

Figure 1D:
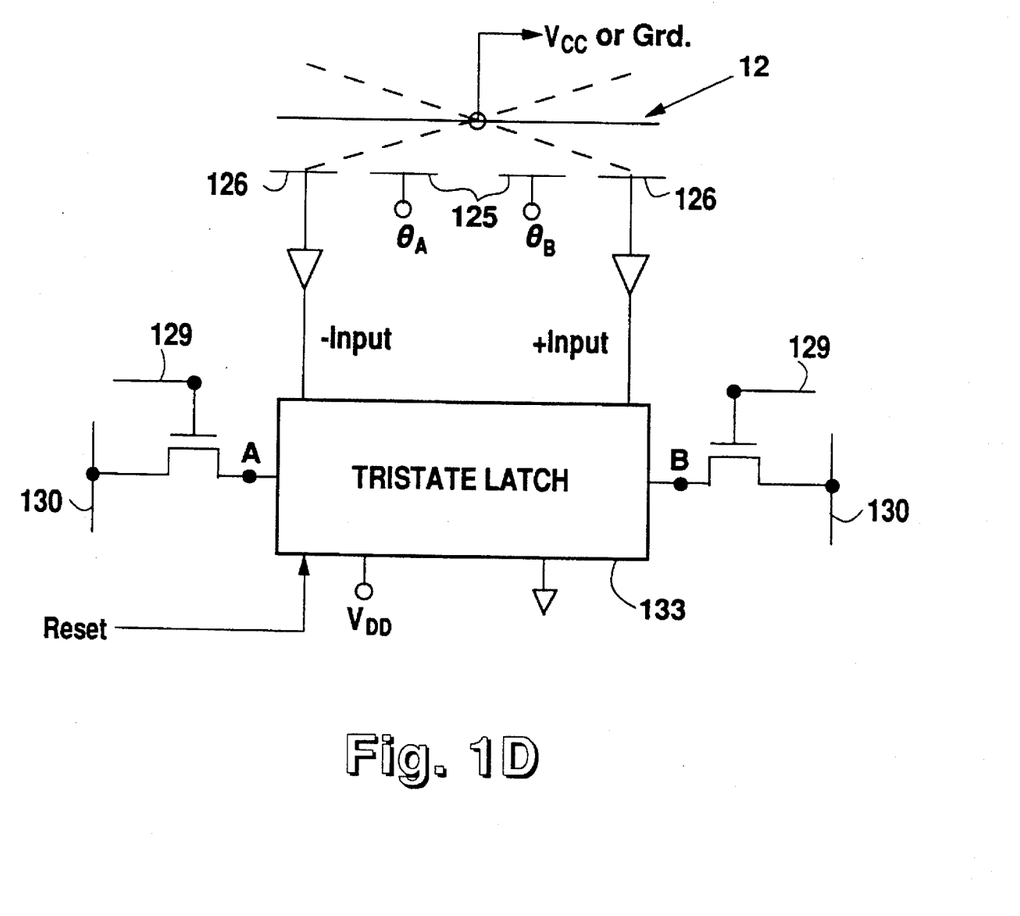
FIG. 1D is a schematic diagram of a latch circuit for storing the output of a sensing element having three possible states.

FIG. 1D illustrates a tri-state latch 133 for storing output and performing test and reset functions. Latch 133 is an alternative to using two memory cells 127 when a sensing element 12 has three possible states. Outputs are read at nodes A and B. Pre-set to a 0,0 state, latch 133 provides either a 1,0 or 0,1 output to indicate either of two tilted states.

Referring again to FIG. 1A, other DRAM or SRAM memory devices could be used for memory 15, including those implemented with conventional memory device fabrication. The important characteristic of a suitable memory 15 is that it have input means for receiving data representing the state of each sensing element 12 at a given point in time, and that it have output means for delivering this data to processor 16.

Processor 16 may be a conventional microprocessor device. Examples of suitable processors 16 are the MC68HC05C9, manufactured by Motorola, Inc., or the TMS 1000 manufactured by Texas Instruments, Incorporated. Both have input means for reading data from arrays 11a–11c via the processor bus 16a. Also, both have on-board memory 18, which may include dynamic (DRAM) or static (SRAM) memory or both. Where processor 16 has on-board memory 18, some part of that memory 18 may be used for memory 15. Processor 16 accesses the memory 15 by providing an address, which is decoded by decoder 17, and which represents the array, column, and row of the sensing element 12 to be read.

At a given point in time, the on or off state of each sensing element 12 is read by processor 16. Processor 16 may either poll through memory 15 or be interrupted by an acceleration event to cause it to read memory 15. The result is a set of binary words that captures the pattern of a given acceleration. This pattern can be compared by processor 16 to known patterns that were previously sensed and stored in a memory 18, such as by using a look-up table of a read only memory (ROM). As an alternative to reading out the state of all sensing elements 12, a set of predetermined sensing elements 12 could be read, and the resulting data compared to expected results for a given acceleration.

Figure 2:
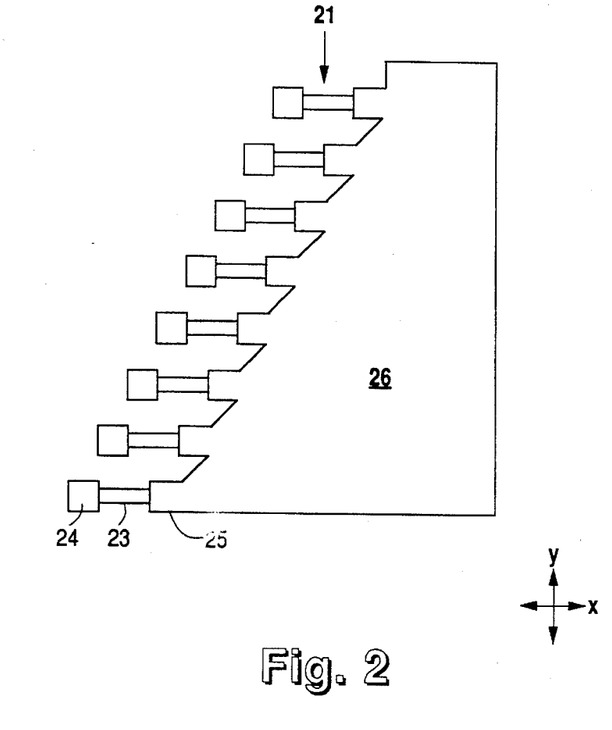
FIG. 2 illustrates a portion of one of the arrays of FIG. 1, used to detect acceleration in an up and down direction.

FIG. 2 is a top plan view of a portion of array 11c, illustrating a cantilever beam type of sensing element 21. These sensing elements 21 are used in array 11c because they are sensitive to up and down forces, i.e., to vertical acceleration in the z direction. Each sensing element 21 has a hinge 23, made from a thin flexible material, and a proof mass 24 at its free end. Hinge 23 is attached to a thick beam 25, which is etched or otherwise shaped from a layer of material 26 during the fabrication process. Mass 24 may be fabricated from the same layer. Hinge 23 is etched from a layer of flexible material, typically thinner than that used for beam 25 and proof mass 24.

Figure 3A:
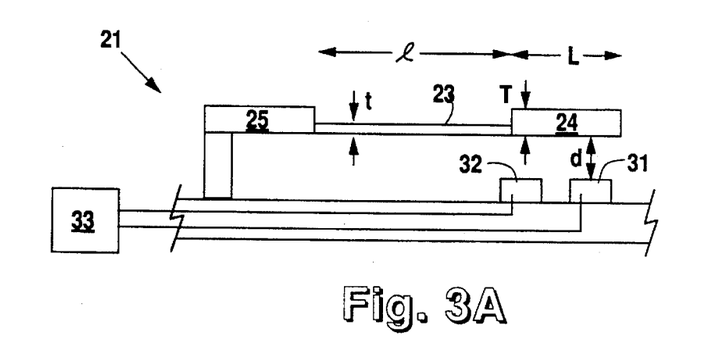
FIGS. 3A and 3B illustrates one of the sensing elements of FIG. 2.

FIG. 3A is a side view of a single sensing element 21, showing its x-z dimensions. Each hinge 23 has a thickness, t, and a length, l. Each proof mass 24 has a thickness, T, and a length, L.

Figure 3B:
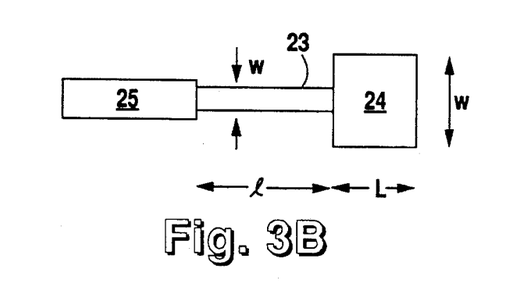

FIG. 3B is a top plan view of a single sensing element 21, showing its x-y dimensions. Hinge 23 has length, l, and width, w. Proof mass 24 has length W, and width L. Its mass value, M, is a function of its dimensions, T, W, and L, as well as its density. As indicated, proof mass 24 may be wider, thicker, and of heavier material than hinge 23.

Referring again to FIG. 3A, a contact electrode 31 provides a means for electrical contact of sensing element 21 in response to acceleration. Electrical leads provide communication with a memory cell 33 for each sensing element 21.

Reset electrode 32 provides a means for resetting the sensing element 21 to prevent "stuck on" error conditions. This may be performed automatically at periodic intervals or after each acceleration event, under control of processor 16. Alternatively, a test algorithm can be executed by processor 16 to detect stuck sensing elements. The reset operation returns each sensing element 21 to its undeflected state. To accomplish this, a short duration reset voltage is applied to reset electrode 32. The reset pulse acts to store potential energy in the sensing elements 21 by deflecting them downward towards the reset electrode 32. When suddenly released, this additional potential energy ensures a uniform, reliable reset action of all sensing elements 21 to their undeflected states.

For purposes of example, a typical sensing element 21 might have a mass having dimensions in the order of 25×25×1 micrometers in width, length, and thickness, respectively. The hinge dimensions are in the order of 50×10×0.06 micrometers in length, width, and thickness, respectively. However, the particular dimensions of each sensing element 21 are determined according to a desired sensitivity to amplitude and responsiveness to frequency of acceleration.

Sensitivity to amplitude depends primarily on three parameters of each sensing element 21: its hinge width, w; the cube of the ratio of its hinge length to thickness $(l/t)^3$; and the value, M, of proof mass 24. As explained below, an additional parameter is the distance, d, the free end of sensing element 21 must travel to close its electrical contact.

For determining appropriate dimensions for each sensing element 21, damping as a result of motion through air is another important consideration. The damping ratio, D.R., for a linear harmonic oscillator is:

$$D.R.=c/[2(m*k)^{1/2}],$$

where c is a damping constant, m is the value of the total mass of sensing element 21, and k is a spring constant associated with hinge 23. For optimal operation of the accelerometer 10, underdamping is desired, such that the damping ratio is less than 1. If the acceleration is an impulsive force, motion in either an up or down direction will be detected.

The sensitivity of each sensing element 21 to frequency is a function of the relationship between its natural undamped resonant frequency and the frequency of the exciting force, F(t), of the applied acceleration. When the frequency of F(t) is less than that of the undamped natural frequency, $f_o$, of a sensing element 21, its displacement is approximately F(t)/k. This situation is quasi-static, the "spring" is distorted by the direct effect of the external force, and inertial and damping forces are negligible. As the frequency of F(t) nears $f_o$, resonance leads to a large amplitude of vibration. When the frequency of F(t) is much greater than $f_o$, the spring and damping forces become negligible, F(t) nearly equals the inertial force, and low amplitudes of motion are produced.

In general, increasing the mass, m, of each sensing element 21, decreases the natural frequency, $f_o$. In terms of radian frequency:

$$w_o = (k/m)^{1/2},$$

where k is the spring constant for a linear restoring force. Increasing the spring constant, k, increases $f_o$.

Thus, smaller values of m lead to resonance at higher frequencies, and larger values of k have the same effect. Also, smaller values of m lead to less sensitivity to a given amplitude of acceleration. The damping ratio decreases with an increase in either m or k. Noticeable resonance occurs for damping ratios well below 0.5.

From a fabrication perspective, as will be explained below in connection with FIG. 4, the cantilever-beam sensing element 21 employs a thin flexural structure, i.e., hinge 23, combined with a thick beam metal overlay, i.e., beam 25. The most easily varied factors are the widths and lengths of hinge 23 and proof mass 24, which are in the plane of the wafer. The thickness, t, of hinge 23 and the thickness, T, of proof mass 24, cannot be easily varied across a given wafer layer. Also, the material can be varied in density to affect the values of m, but again, only at a wafer level. Thus, the value $(1/t)^3$, which is a dominant factor in amplitude sensitivity, is precisely controlled during fabrication.

Figure 4:
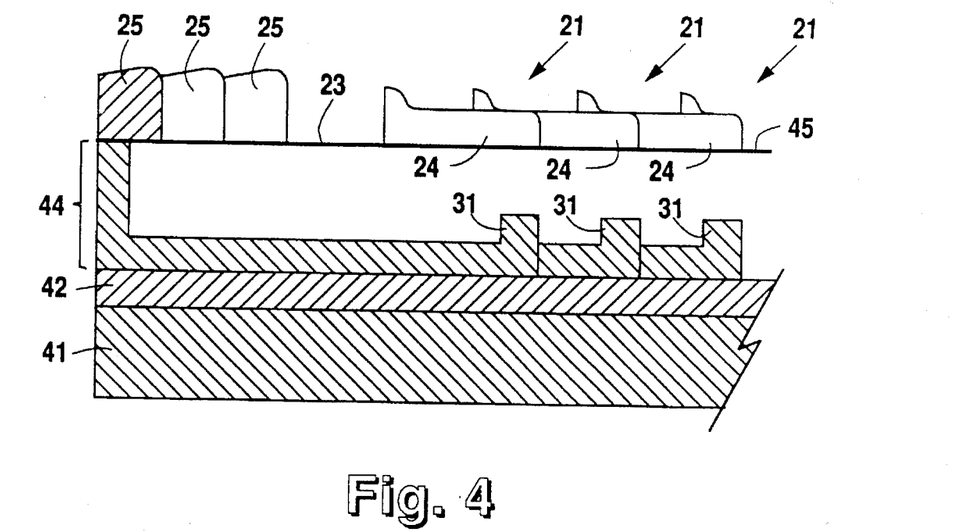
FIG. 4 is a cross sectional view illustrating the fabrication of the array of FIG. 2.

FIG. 4 illustrates a cross section of a portion of array 11c, showing three sensing elements 21. Each sensing element 21 is resonant at a different frequency, $f_o$. The array 11c is based on a silicon substrate 41, which is covered by an insulating layer 42. Contact electrodes 31 are fabricated on a spacer layer 44, with each sensing element 21 having a contact electrode 31 under it. After spacer layer 44 has been etched to form contacts 31, an air gap remains under the sensing elements 21. A thin metal layer 45 is used to form hinges 23 of each sensing element 21. A thicker metal layer forms their proof masses 24 and beams 25.

The sensing elements 21 are in ascending order of hinge length, with the sensing element with the smallest overall mass and the shortest hinge length, 1, having the highest resonant frequency, $f_o$. Any of the frequency adjusting parameters, k or m, where k is a function of 1, w, and t, can be used to set the frequency response.

For a given frequency sensitivity, variation of the compliance of the sensing element 21, while holding $f_o$ constant, provides amplitude sensitivity for a range of exciting forces. Any of the amplitude sensitivity parameters, w, $(1/t)^3$, or m, could be varied while holding $f_o$ constant. Typically, m is varied by changing values of M.

The thickness of the air gap formed in spacer layer 44 is another relevant factor in determining whether an electrical response is detected from a sensing element 21. In other words, detection by accelerometer 10 depends not only on whether a sensing element 21 moves in response to excitation, but also whether its movement is sufficient to make contact with its contact electrode 25. The sensing elements 21 most closely resonant with the exciting force of acceleration will build in amplitude, but if the force is too small, contact will not be made, and the motion will be undetected. Thus, as an alternative to varying M or some other parameter of the sensing element 21, variation of the spacer thickness permits a range of amplitudes to be detected, in that a smaller air gap will require less force to close a contact.

Figure 5:
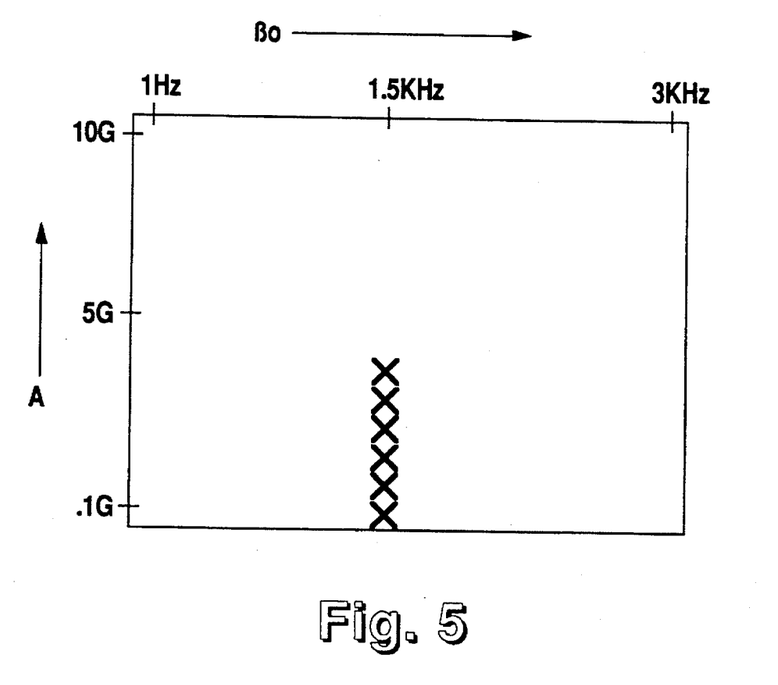
FIG. 5 illustrates the arrangement of sensing elements in the arrays of FIG. 1 to measure both frequency and amplitude of acceleration.

As shown in FIG. 5, array 11c would therefore contain a set of sensing elements 21 designed to respond to varying levels of a frequency spectrum, as well as a set of sensing elements 21 whose frequency response is the same for a range of acceleration amplitudes. As an example, array 11c provides frequency detection for a range of 1 to 3 kilohertz in 50 hertz steps, and amplitude detection for a range of 0.1 gravities to 10 gravities in 0.1 gravity steps. Thus, array 11c has 41 columns and 100 rows of sensing elements 21.

Each row of array 11c is a line of sensing elements 21, each of which is resonant at a frequency, $f_o$, which is one frequency step higher than the resonant frequency of the previous element. As explained above, frequency response can be adjusted by varying m or k. For each frequency level, the corresponding column has sensing elements 21 with incrementally increasing sensitivity, i.e., their threshold response is to incrementally lower amplitudes. The amplitude thresholds are varied by varying the amplitude parameters discussed above, while holding $f_o$ constant for that column.

The value M of proof mass 24, as determined by its dimensions L, W, and T, is one means to vary the amplitude sensitivity of a sensing element 21. Increasing M increases amplitude sensitivity, but at the same time, reduces the resonant frequency because of the resulting increase in m. Accordingly, within a column, to hold $f_o$ constant, k or m must be adjusted if M is adjusted. In one embodiment, within each column, for a given frequency level, M is varied to provide variations in amplitude sensitivity. At the same time, the length, 1, of hinge 23 is varied to hold $f_o$ constant.

At a particular exciting frequency, all sensing elements 21 in the appropriate column are resonant. Within that column only those sensing elements 21 whose sensitivity is sufficient to detect a certain threshold amplitude make contact with their contact electrodes 25. Thus, for example, for an exciting frequency of 1.5 kilohertz at 5 gravities, those sensing elements 21 in the 1.5 kilohertz column that have a sensitivity threshold less than 5 gravities are "on". The "string" of "on" bits that are stored in memory 15 provides an automatic error detection, in that continuity indicates a valid signal. The continuity increases with the amplitude of an applied acceleration.

Figure 6A:
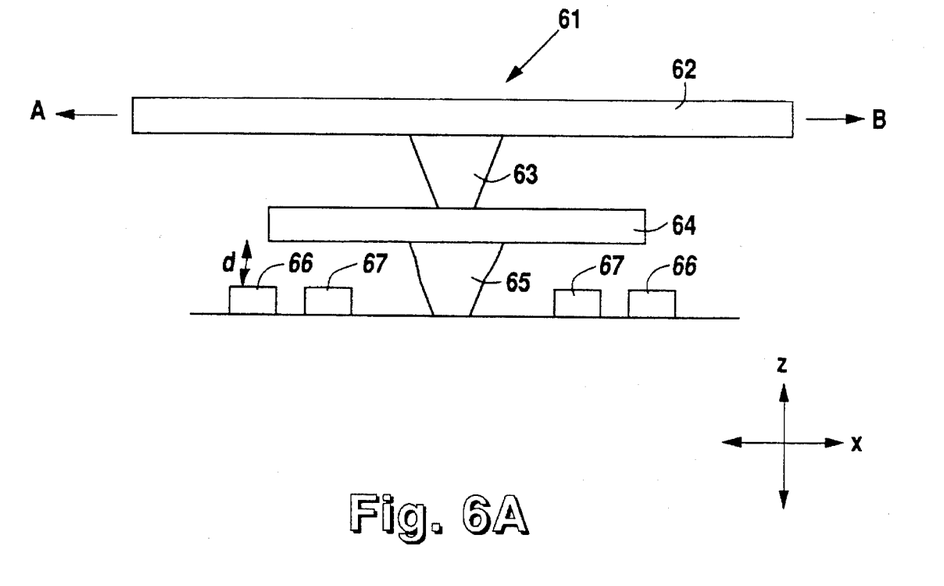
FIGS. 6A and 6B illustrate a sensing element for detecting acceleration in side to side directions.
Figure 6B:
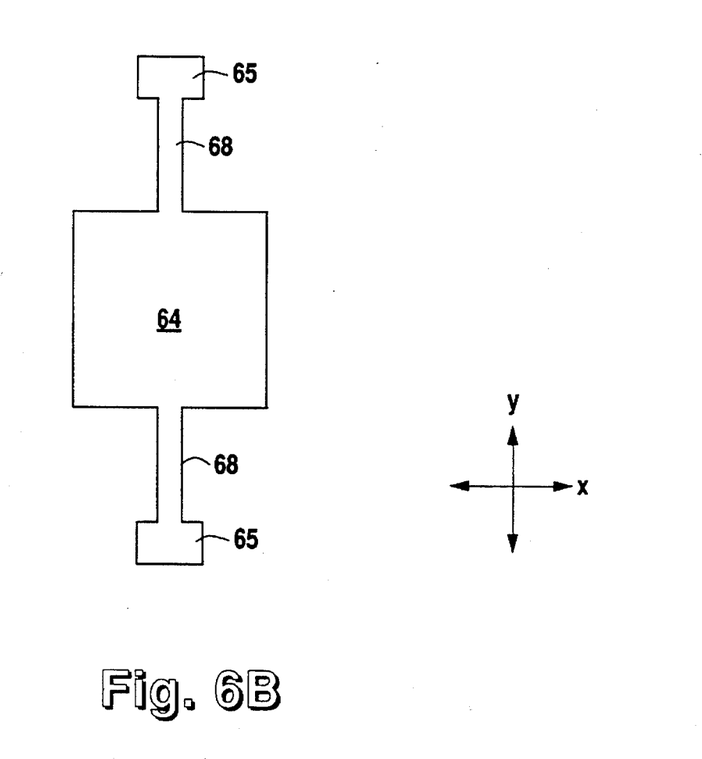

FIGS. 6A and 6B illustrate a sensing element 61, such as is used for arrays 11a and 11b, i.e. for detecting horizontal acceleration in either the x or y direction. FIG. 6A is a side view in the x-z plane, through the center of sensing element 61. FIG. 6B is a top plan view in the x-y plane with proof mass 62 and mass support post 63 removed. Proof mass 62, is attached to a support plate 64, by means of mass support post 63. Support plate 64 is supported between torsional hinge elements 68. Hinge support posts 65 support the hinge elements 68.

When sensing element 61 is subjected to acceleration along the x axis, mass 62 responds by moving in direction A or B. The motion will be primarily translational, except that a small amount of rotational motion of support plate 64 will cause it to tilt downward. If the resonant frequency and amplitude sensitivity threshold for sensing element 61 are reached, the tilt of support plate 64 causes it to contact a contact electrode 66.

Sensing elements 61 are used in arrays 11a and 11b with the axis of hinge elements 68 in the x-y plane. For detecting translational acceleration in the x direction, the hinge axis is orthogonal to the x axis, so that the tilt of support plate 64 is along the x axis. For detecting translational acceleration in the y direction, the hinge axis is orthogonal to the y axis, in the plane of the array, so that the tilt of support plate 64 is along the y axis.

Contact electrodes 66 and reset electrodes 67 are placed parallel to the axis of hinges 68. Reset electrodes 67 are used to reset sensing element 61 in a manner similar to the reset of sensing element 21, except that the reset operation is applied to both sides of support plate 64.

For a torsional sensing element 61, the resonant frequency is given by:

$$f_o = \frac{1}{2\pi}[T/(I\,\theta)]^{1/2},$$

where I is the moment of inertia, T is the restoring torque at the peak rotational angle, θ. The ratio, T/θ, corresponds to the spring constant, k, and is a measure of rotational stiffness. Thus, $f_o$ can be increased by decreasing the moment of inertia, I, or by increasing the restoring torque, T, at a given angle of rotation. The torsional constant of support plate 64 is proportional to the cube of its thickness, $t^3$ and its width, w. The rotational moment of inertia, I, is generally quadratic with respect to the radius of gyration. By building sensing elements 61 with varying thickness, size, and distribution of proof mass 62, in combination with varying thickness, width, and length of hinge 68, the frequency response and amplitude sensitivity of each sensing element 61 may be varied.

Thus, like sensing elements 21, sensing elements 61 are fabricated in arrays 11a and 11b with their dimensions adjusted for frequency response and amplitude sensitivity. The amplitude sensitivity is a function of the dimensions of each support plate 64, as well as by the height, h, of support posts 65, and the value, M, of proof mass 62. As in the case of sensing elements 21, these parameters can be varied such that for a given frequency response, sensing elements 61 having varying sensitivity to amplitude are provided. Arrays 11a and 11b have the same basic configuration as that of FIG. 5, with rows and columns of incrementally varying in frequency response and amplitude sensitivity.

A method of fabricating an array of micro-mechanical elements, similar in structure to sensing elements 61, using integrated circuit techniques is described in U.S. patent Ser. No. 07/811,407, now U.S. Pat. No. 5,233,456, entitled "Resonant Mirror and Method of Manufacture", which is incorporated by reference herein. In that patent application, a mirror rather than a proof mass 62 is placed atop support post 63. In general, the fabrication is otherwise the same, except that, in the present invention, the dimensions of each sensing element 61 are adjusted for sensitivity for amplitude and response to frequency of acceleration.

Referring again to FIGS. 1 and 5, where "sensing elements 12" refers to either type of sensing element 21 or 61, in the preferred embodiment, data are read out efficiently by reading across the bottom row of sensing elements 12. This data represents the least significant bit of amplitude sensitivity. Then, those columns indicating a frequency response are read to their most significant bit. The result is a set of data points, denoting an acceleration in terms of amplitude and frequency. This read out can be performed over time. The data points, in terms of time, frequency, and amplitude, can be compared to a stored look-up table in memory 18 for analysis. As an example of an application, an accelerometer 10 installed in an automobile could recognize the acceleration pattern for an imminent collision. It would then send a message to a air bag control system.

As an example of a method for writing sensor data to memory 15, sensing elements 12 of each array 11a–11c are grouped into blocks. A block may be selected for reading out data in a number of different methods. A first method is to commutate sequentially through an array 11a–11c, block by block, disabling or grounding all but the elements of the block to be sensed. Alternatively, all elements 12 other than those in the block to be sensed are forced to an "off condition" similar to operation of the DMD devices described in the patent referenced above. For purposes of example herein, each block has eight sensing elements 12. The output from each block 13 is an eight-bit word that may stored at a unique address in processor memory 18 for later inquiry or analysis.

Figure 7:
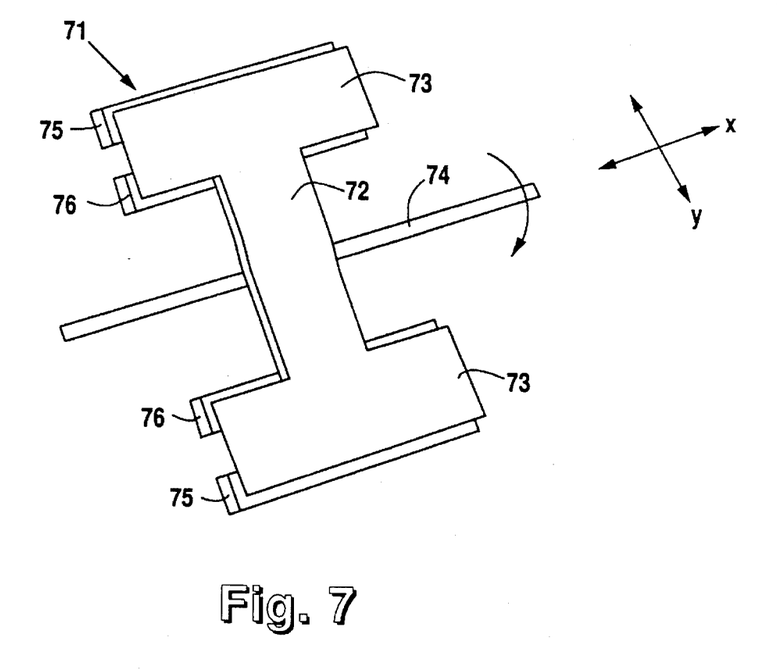
FIGS. 7 and 8 illustrate sensing elements for detecting front-to-back or side-to-side rotational acceleration.

FIG. 7 is a perspective view of a sensing element 71 for detecting rotation about the x axis. A beam 72 having a mass 73 at each end, is centered over and supported by a torsion hinge 74. An applied rotational acceleration about the x axis causes sensing element 71 to tilt. At a predetermined frequency response and amplitude, sensing element 71 touches one of the contact electrodes 75. Reset electrodes 76 are used to prevent sensing elements 71 from being stuck, in the manner described above.

Masses 73 have their centers of mass removed away from the torsion hinge 74. As the value M of each mass, or its distance from hinge 74 increases, sensing element 71 has a lower frequency response and more sensitivity.

Figure 8:
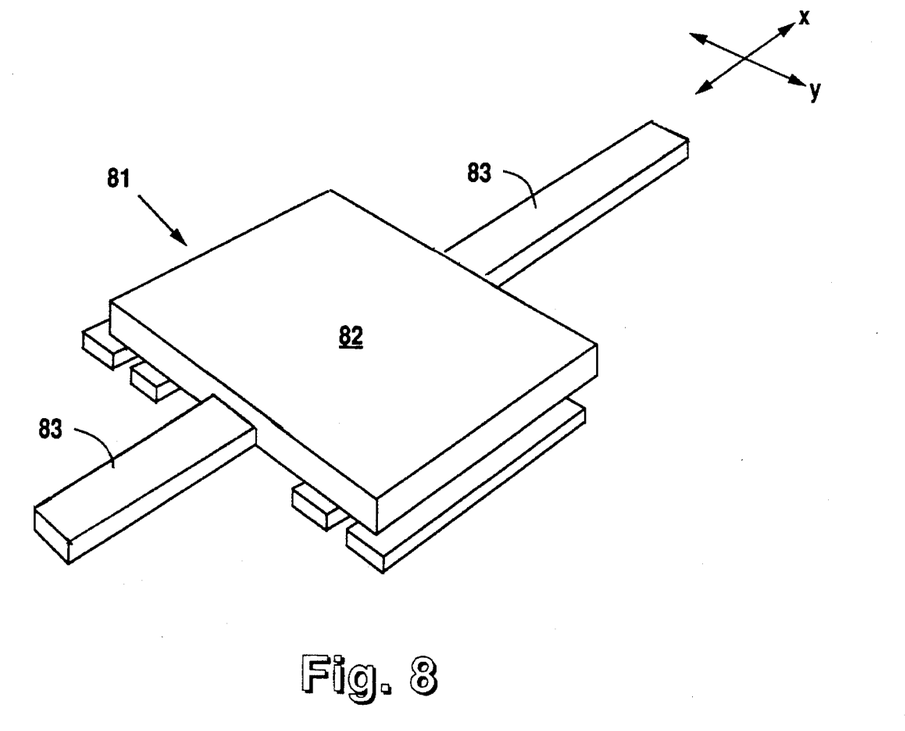

FIG. 8 is a perspective view of a sensing element 81, which may also be used for detecting rotational acceleration around the x axis. Sensing element 81 consists of a beam 82 suspended between torsion hinge elements 83 at opposing ends. Sensing element 81 is similar to sensing element 61 except for the absence of support post 63 and mass 62.

Sensing elements 71 and 81 may also be used to detect rotation about the y axis. For this function, each sensing element 71 or 81 is turned ninety degrees in the same plane so that hinges 74 and 83, respectively, are along the y axis.

In general, sensing element 71 as well as sensing element 81, are similar to sensing element 61, except that they do not have a proof mass 62 displaced vertically from the hinge axis. The effect of such a displacement is that sensing element 61 is more sensitive to translational acceleration and less sensitive to rotational acceleration than sensing elements 71 and 81. In the case of sensing elements 71 and 81, the constraint from the tension of torsional hinges 74 and 83, as compared to their torsional compliance, enhances rotational movement and diminishes translational movement.

The frequency response dynamics of sensing elements 71 and 81 also follows the expression:

$$f_o = \frac{1}{2\pi}[T/(I\,\theta)]^{1/2},$$

as described above in connection with FIGS. 6A and 6B. Using parameter adjusting techniques similar to those described above, an array of sensing elements 71 or 81, like the array 11 of FIG. 5 can be created, in which rows and columns of sensing elements 71 or 81 have incrementally varying frequency response and thresholds of amplitude sensitivity.

An advantage of the invention is that all sensing elements 21, 61, 71, 81, and 91 may be fabricated by means compatible with CMOS fabrication techniques. This permits arrays 11a–11f to be fabricated directly on top of circuitry for memory 15 and processor 16.

Figure 9:
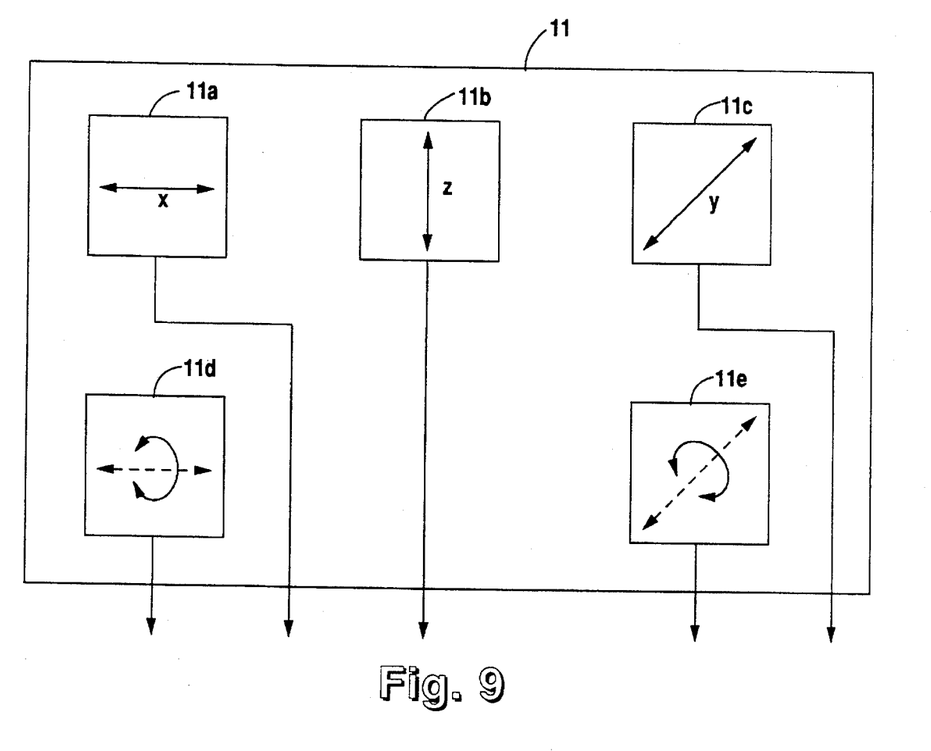
FIG. 9 illustrates an accelerometer having a number of sensing elements arrays for detecting five types of acceleration.

FIG. 9 illustrates an accelerometer 90 having five arrays 11a–11f, one for each direction of translational acceleration and for rotational acceleration in the horizontal plane. The data available from accelerometer 90 provides a comprehensive range of frequency, amplitude, and temporal information. To accommodate the fact that some translational sensing elements might also have some sensitivity to rotational acceleration, or vice versa, mathematical correlations can be made to distinguish rotational from translational data.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of measuring the amplitude and frequency of a rotational acceleration comprising the steps of:

subjecting an array of micro-mechanical sensing elements to a rotational acceleration event, said micro-mechanical sensing elements each comprising a deflectable member and a corresponding contact electrode, said deflectable members of said micro-mechanical sensing elements deflecting to contact said corresponding contact electrodes in response to a rotational acceleration having a predetermined frequency and amplitude;

generating an electrical signal to indicate which of said deflectable members in said array are in contact with said corresponding contact electrodes; and detecting said electrical signal to determine the frequency and amplitude of said rotational acceleration event.

2. The method of claim 1, wherein said step of generating comprises generating a data bit from each micro-mechanical sensing element in a row of said array wherein each micro-mechanical sensing element in said row has a different resonant frequency, and generating a data bit from each micro-mechanical sensing element in a column of said array wherein each micro-mechanical sensing element in said column has a different sensitivity to amplitude of acceleration.

3. The method of claim 1, further comprising the step of comparing said electrical signal with a previously stored electrical signal to determine whether a given acceleration has occurred.

4. The method of claim 1, wherein said micro-mechanical sensing elements in said array are torsion beam sensing elements for detecting rotational acceleration about a horizontal axis, each of said torsion beam sensing elements comprised of two torsion hinges, and a beam attached to said torsion hinges, wherein said micro-mechanical sensing elements in said array differ from one another by at least one parameter from the group consisting of hinge length, hinge thickness, hinge width, beam length, beam width, and beam thickness, such that each micro-mechanical sensing element in said array responds to a rotational acceleration having a unique combination of frequency and amplitude.

5. The method of claim 1, wherein said micro-mechanical sensing elements in said array are torsion beam sensing elements for detecting rotational acceleration about a horizontal axis, each of said torsion beam sensing elements comprised of two torsion hinges, a beam having two ends, said beam attached to said torsion hinges, and a mass attached to each end of said beam, wherein said micro-mechanical sensing elements in said array differ from one another by at least one parameter from the group consisting of hinge length, hinge thickness, hinge width, beam length, beam width, beam thickness, mass length, mass width, mass thickness, and mass density, such that each micro-mechanical sensing element in said array responds to a rotational acceleration having a unique combination of frequency and amplitude.

6. A method of measuring the amplitude and frequency of a rotational acceleration comprising the steps of:

providing at least two accelerometer arrays, each of said accelerometer arrays comprising sensing elements arranged as a sensing element array, each of said accelerometer arrays further comprising contact electrodes, each of said sensing elements able to deflect in response to a rotational acceleration having a unique frequency and amplitude and to contact at least one of said contact electrodes, each of said at least two accelerometer arrays configured for detecting rotational acceleration about a unique axis;

subjecting said at least two accelerometer arrays to a rotational acceleration force, said acceleration force causing certain of said sensing elements in said at least two accelerometer arrays to deflect and to contact at least one contact electrode in said at least two accelerometer arrays;

generating an electrical signal indicating which of said sensing elements in said at least two accelerometer arrays is in contact with at least one contact electrode in said at least two accelerometer arrays; and detecting said electrical signal to determine the frequency and amplitude of said rotational acceleration force.

7. A method of measuring the amplitude and frequency of a rotational acceleration comprising the steps of:

providing an accelerometer array comprised of:

micro-mechanical sensing elements arranged as a sensing element array, each of said micro-mechanical sensing elements having a resonant frequency and an amplitude threshold;

contact electrodes positioned such that when one of said micro-mechanical sensing elements is subjected to a rotational acceleration having a frequency and amplitude sufficient to deflect said one micro-mechanical sensing element, said one micro-mechanical sensing element deflects and contacts one of said contact electrodes; and memory cells arranged as a memory array for storing data indicating which of said micro-mechanical sensing elements are in contact with one of said contact electrodes;

deflecting a subset of said micro-mechanical sensing elements in response to a rotational acceleration event; and reading said data stored in said memory cells from at least a portion of said memory array to determine the amplitude and frequency of said acceleration event.

8. The method of claim 7 further comprising the step of:

comparing data stored in said memory cells with previously stored data to determine whether a given rotational acceleration has occurred.

9. A digital accelerometer for detecting rotational acceleration about a first axis, comprising:

a first array of sensing elements for detecting rotational acceleration around said first axis, wherein each of said sensing elements has a tilting beam attached to at least one corresponding torsion hinge, wherein each said tilting beam is in a plane parallel to said first axis and is operable to tilt toward an underlying contact electrode when each said sensing element is subjected to acceleration about said first axis, and wherein said first array has rows and columns of said sensing elements, said sensing elements adjusted so that said first array detects a range of frequency levels and a range of amplitudes of acceleration at each of said frequency levels;

wherein said tilting beams and said contact electrodes of said first array are generally in parallel planes, and wherein each of said tilting beams has two tilted states and an untilted state, depending on whether said tilting beam has been tilted counterclockwise, clockwise, or not tilted.

10. The accelerometer of claim 9, wherein each said tilting beam is centered over and supported by each said corresponding torsion hinge, which permits each said tilting beam to tilt in either of two directions toward each said underlying contact electrode.

11. The accelerometer of claim 9, wherein each said tilting beam is suspended between two torsion hinges, one hinge at each opposing end of each said tilting beam, which permits each said tilting beam to tilt in either of two directions toward each said underlying contact electrode.

12. The accelerometer of claim 9, and further comprising a second array of sensing elements similar in structure to said first array, said second army of sensing elements aligned orthogonally to said first array for detecting rotational acceleration around a second axis.

13. The accelerometer of claim 9, and further comprising a pair of reset electrodes associated with each of said sensing elements for restoring each said tilting beam to an untilted position.

14. The accelerometer of claim 9, and further comprising at least one memory cell associated with each sensing element, said at least one memory cell for storing an electrical signal from said contact electrodes.

15. The accelerometer of claim 9 further comprising at least one reset electrode underlying each said tilting beam, each said reset electrode for freeing each said tilting beam should each said tilting beam become stuck to each said contact electrode.

16. The accelerometer of claim 9 further comprising at least one test electrode underlying each said tilting beam, each said test electrode for deflecting each said tilting beam in response to a voltage signal applied to each said test electrode.

17. An accelerometer for measuring rotational acceleration about an axis, said accelerometer comprising:

a first array of sensing elements fabricated on a substrate, each of said sensing elements comprising;
  at least one torsion hinge, said torsion hinge for generating a restoring torque;
  a tilting beam attached to and suspended away from said substrate by said torsion hinge, said tilting beam having a length from a first end to a second, opposite end, said tilting beam having a moment of inertia, said tilting beam operable for tilting toward said substrate in response to a rotational acceleration of a predetermined frequency and amplitude;
  at least one contact electrode on said substrate proximate said tilting beam, said contact electrode for contacting said tilting beam when said tilting beam is tilted toward said substrate;
  at least one reset electrode fabricated on said substrate proximate said tilting beam, said reset electrode for freeing said tilting beam should said tilting beam become stuck to said contact electrode; and wherein said sensing elements in said array of sensing elements are responsive unique combinations of frequency and magnitude such that a given acceleration event deflects a first portion of said sensing elements m said array of said sensing elements and does not deflect a second portion of said sensing elements in said first array of said sensing elements.

18. The accelerometer of claim 17, having each said tilting beam supported by two of said torsion hinges such that each said tilting beam can tilt in either of two directions toward one of two said contact electrodes.

19. The accelerometer of claim 17 further comprising:

a second array of said sensing elements fabricated on said substrate, said second array of sensing elements aligned orthogonally to said first array of sensing elements for detecting rotational acceleration about an orthogonal axis.

20. The accelerometer of claim 17 further comprising:

at least one memory cell associated with each said sensing element for storing an electrical signal from said contact electrodes.

21. An accelerometer for measuring rotational acceleration about an axis, said accelerometer comprising:

a first array of sensing elements fabricated on a substrate, each of said sensing elements comprising;
  at least one torsion hinge, said torsion hinge for generating a restoring torque;
  a tilting beam attached to and suspended away from said substrate by said torsion hinge, said tilting beam having a length from a first end to a second, opposite end, said tilting beam having a moment of inertia, said tilting beam operable for tilting toward said substrate in response to a rotational acceleration of a predetermined frequency and amplitude;
  at least one contact electrode on said substrate proximate said tilting beam, said contact electrode for contacting said tilting beam when said tilting beam is tilted toward said substrate;
  at least one test electrode fabricated on said substrate proximate said tilting beam, said test electrode operable to deflect said tilting beam such that said tilting beam contacts said contact electrode when a test voltage is applied to said test electrode; and wherein said sensing elements in said first array of sensing elements are responsive unique combinations of frequency and magnitude such that a given acceleration event deflects a first portion of said sensing elements in said array of said sensing elements and does not deflect a second portion of said sensing elements in said array of said sensing elements.

22. The accelerometer of claim 21, having each said tilting beam supported by two of said torsion hinges such that each said tilting beam can tilt in either of two directions toward one of two said contact electrodes.

23. The accelerometer of claim 21 further comprising:

a second array of said sensing elements fabricated on said substrate, said second array of sensing elements aligned orthogonally to said first array of sensing elements for detecting rotational acceleration about an orthogonal axis.

24. The accelerometer of claim 21 further comprising:

at least one memory cell associated with each said sensing element for storing an electrical signal from said contact electrodes.

* * * * *